Feb. 6, 1934.  W. C. DESMOND  1,946,314
BATTERY FILLING DEVICE
Filed Aug. 17, 1931
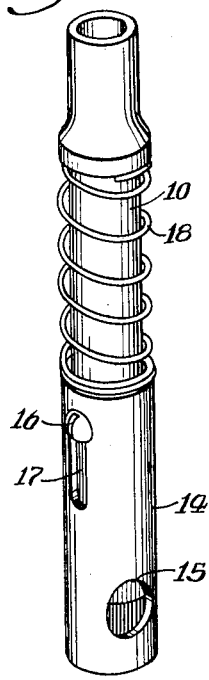
Fig. 1
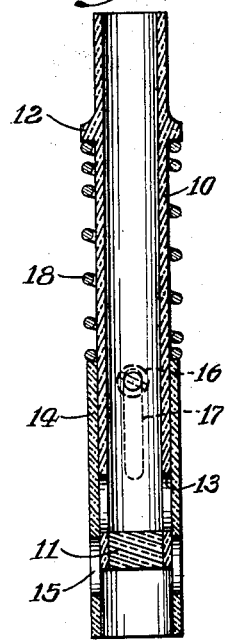
Fig. 2
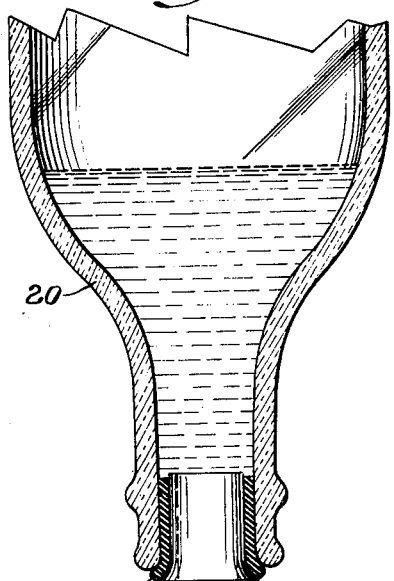
Fig. 4
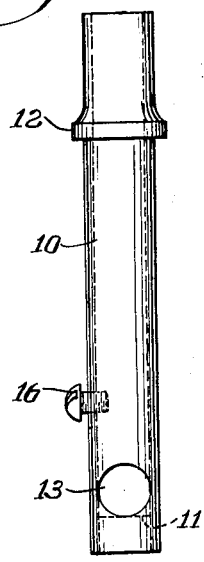
Fig. 3
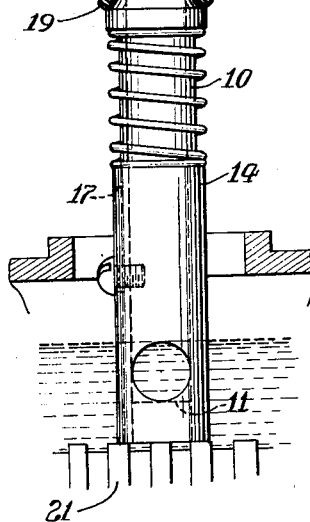
Inventor
William C. Desmond
By John F Brezina
Atty.

Patented Feb. 6, 1934

1,946,314

UNITED STATES PATENT OFFICE 1,946,314

BATTERY FILLING DEVICE

William C. Desmond, Chicago, Ill.

Application August 17, 1931. Serial No. 557,486

11 Claims. (Cl. 215—78)

This invention relates to a highly improved and novel liquid filling device for receptacles and more particularly to one adaptable for filling battery cells with water.

In adding water during servicing of batteries to maintain the same in efficient operation, it is important that the proper amount of water be added to raise the solution within the battery cell to an adequate level about the top of the plates and also to leave a space above the liquid level for the gases created by the chemical reaction from which they may gradually escape through an aperture in the battery cell cap. If too much water is put in the resultant solution will splash out when the battery is mounted in a movable vehicle, and if insufficient water is added the top of the plates are left exposed and subjected to rapid deterioration. My invention comprises a device in which the desired amount of water can be introduced into the cell to submerge the plates a desired distance below the surface of the water and also maintain a space between the surface of the water and the top of the battery.

An important object of my invention is the provision of means whereby an amount of liquid may be conveniently and quickly added to a battery cell or the like to bring the level of the liquid to a predetermined level above the plates.

A further important object of my invention is the provision of a device which is economically manufactured and which is conveniently attachable to a liquid container which, when inserted into a cell, will discharge its liquid contents until the water has reached a predetermined level and in which the flow of water will stop as quickly as such predetermined level is reached.

A further object of my invention is the provision of a battery filler which will not drip or deposit any part of its contents on the outer surface of the cell and which will remain sealed until the device is pressed downwardly to open a passage to permit exit of liquid and intake of air into the liquid container.

Other and further important objects of this invention will be apparent from the disclosures in the specification and the accompanying drawing.

This invention (in a preferred form) is illustrated in the drawing and hereinafter more fully described.

On the drawing:

Fig. 1 is a perspective view of my battery filling device.

Fig. 2 is a cross section taken longitudinally of Fig. 1.

Fig. 3 is a side elevation of the main body portion of my device with associated parts removed.

Fig. 4 is a side elevation, partly in section, showing the position of my device in operation.

As shown on the drawing:

My battery filling device eliminates the well known objectionable features above recited and comprises an elongated tube member 10 which has one end thereof sealed by a plug 11 as shown in Fig. 2. The tube member 10 has an annular flange 12 formed integral therewith a short distance from the end opposite the plug 11, the flange 12 forming a stop for a stopper 19, which is preferably of rubber. The stopper 19 provides convenient means whereby my device is inserted in the neck of a bottle, hose, or other liquid containing receptacle. At its juncture with the flange 12 the wall of tube member 10 is gradually enlarged to form a more perfect seal when inserted into the neck of a bottle or other container.

The tubular member 10 is preferably made of a non-conducting material such as bakelite, and the longitudinal passage therethrough is of sufficient size to permit simultaneous intake of air and discharge of liquid from the container.

Diametrically opposite apertures 13 of relatively large size are formed in the wall of the tube member 10 adjacent the sealed end thereof and at a point so that the distance between the upper periphery of said apertures and the end of said tube 10 will be equal to the depth of the solution within the battery cell when the discharge of water ceases.

A sleeve 14 made of a similar non-conducting material and of a length approximately one-half the length of tube member 10, is adapted to slide snugly along the outside of the tubular member 10 as clearly shown in Figs. 1 and 2.

The sleeve 14 has diametrically opposite apertures 15, as clearly shown in Fig. 1, which are adapted to register with the apertures 13 of the tube member 10, said apertured sleeve forming a sleeve valve adapted to open and close the apertures 13 of tube member 10. The sleeve member 14 is held against rotation on the tubular member 10 and its longitudinal movement limited by a screw 16 secured in the side of the tube 10, and its projected portion sliding in a slot 17 formed in the side of said sleeve. The slot 17 is of such length as to permit the sleeve 14 to complete registry of apertures 15 and 13 when the sleeve is in liquid discharging position.

The sleeve 14 is normally held in valve closing position as shown in Fig. 2 by a helical metal spring 18 which encircles the tube 10 between the end of said sleeve and the flange 12. One end of the spring presses against the flange 12 while the upper end presses against the periphery of sleeve 14.

To mount the above described device into the neck of a bottle a hose, or other standard container, a stopper 19 preferably made of rubber is placed about the inlet portion of the tube 10 until one edge thereof flares outwardly due to the shoulder at the juncture with the flange 12. The device is then quickly and conveniently removably secured in the neck of a liquid container 20 as shown in Fig. 4, which container contains water to be added to battery cells. The operator upon removing the cap of a battery cell need only to invert the liquid container and insert the device into the cell in the position shown in Fig. 4 so that the end of the sleeve 14 bears against the top of the battery plates 21, whereupon he need only to press the bottle downwardly to cause the tube 10 and liquid container 20 to move downwardly to register apertures 13 and 15, thereby opening the passage to permit discharge of water from within the container into the cell. An important feature of my invention is that the size of the apertures 13 and 15 and the passage through the tube 10 are of relatively large size in order to not only permit discharge of water from within the liquid container, but also to permit ingress of air during such liquid discharge until the level of the solution in the battery cell reaches a point immediately above the uppermost periphery of the apertures 13 and 15, whereupon further air is prevented from entering the container. As soon as the solution has reached the level last mentioned the water will cease to be discharged from the container and from the passage through tube 10 due to atmospheric pressure on the surface of the solution in the battery cell.

It will be apparent that by placing the apertures 15 at a point so that their upper periphery will be the height to which the solution will rise in the battery cell, the flow of air through tube 10 into the container will cease as quickly as the solution covers said apertures.

My device may be conveniently attached to the end of a flexible rubber hose which is standard equipment by merely inserting the rubber stopper 19 into the end of said hose and operating my device in a manner similar to that hereinbefore described.

I am aware that many changes may be made and numerous details of construction may be varied through a wide range without departing from the principles of this invention, and I therefore do not purpose limiting the patent granted hereon otherwise than necessitated by the prior art.

I claim as my invention:

1. A device of the class described comprising a tube member having one end sealed and having side apertures adjacent said sealed end; a stopper at the other end of said tube to provide means whereby said device is inserted into a receptacle; an external sleeve slidable on said tube, said sleeve having apertures adapted to register with the said tube apertures, and a helical spring about said tube and normally pressing against one end of said sleeve to normally hold said sleeve in a position to seal said tube apertures.

2. A device of the class described comprising a tube member having one end sealed and having side apertures adjacent said sealed end; a stopper at the other end of said tube to provide means whereby said device is inserted into a receptacle; an external sleeve slidable on said tube, said sleeve having apertures adapted to register with the said tube apertures, and a helical spring about said tube and normally pressing against one end of said sleeve to normally hold said sleeve in a position to seal said tube apertures, said sleeve being adapted to be moved against the action of said spring to place said apertures in register.

3. A battery filling device comprising a container; an elongated tube member having one end sealed and having side outlet ports; an external sleeve slidable on one end of said tube member and having side apertures; means adapted to limit relative longitudinal movement of said sleeve and said tube, and a helical spring about said tube adapted to normally hold said sleeve in sealing position.

4. A liquid filler for receptacles comprising two interfitting tube members, both having side apertures adapted to register at predetermined relative positions thereof, said inner member having a stopper at one end and communicating with the liquid source; a longitudinal slot in said outer member; a screw in said inner member adapted to slide in said slot to limit relative movement of said interfitting members; a helical spring about said inner member adapted to normally hold said outer member in a position to seal the apertures of said inner member and being compressible to register said apertures to permit discharge of liquid.

5. A device of the class described adapted to be inserted in the outlet of a receptacle to seal the same comprising an elongated tube member, said tube having its outer end sealed and having side outlet apertures; a yieldable sealing element about one end of said tube; an annular flange on said tube; a stud secured in the side of said tube member; a sleeve slidable on said tube member and having side apertures adapted to register with said tube member apertures at a predetermined relative position; and a helical spring about said tube member adapted to normally hold said sleeve in a position to seal said tube member apertures.

6. A liquid filling device for receptacles comprising a container; a tube leading from the container, said tube having its outer end sealed and having transverse side apertures adjacent said sealed end; a sleeve slidable on the outside of said tube and having apertures adapted to register with said tube apertures; means on said tube to limit longitudinal movement of said tube, and a helical spring about said tube adapted to normally hold said tube so that said apertures are out of register.

7. A device of the class described comprising a tubular member for connection at one end to a liquid supply, said member having the other end closed and having apertures therein adjacent said closed end, a sleeve member slidably positioned over the closed end of said tubular member, and means tending to maintain said sleeve in normal position covering said apertures whereby when pressure is applied to said sleeve to move the same to uncover said apertures the liquid may flow out of said apertures and when said pressure is released said sleeve is automatically returned to normal position.

8. A device of the class described comprising a tubular member for connection at one end to a liquid supply, said member having the other end closed and having apertures therein adjacent said closed end, a sleeve member slidably positioned over the closed end of said tubular member and having a portion normally projecting therebeyond, the closed end of said tubular member and said sleeve forming a tight connection to prevent the escape of liquid therebetween, means tending to maintain the sleeve projecting beyond the closed end of said tubular member, said sleeve being movable to uncover the apertures in said tubular member and means to limit the relative movement between the sleeve and tubular member.

9. A device of the class described comprising a tubular member for connection at one end to a liquid supply, said member having the other end closed and having apertures therein adjacent said closed end, a sleeve member slidably positioned over the closed end of said tubular member and having a portion normally projecting therebeyond, the closed end of said tubular member and said sleeve forming a tight connection to prevent the escape of liquid therebetween, a projecting portion extending outwardly from said tubular member, a coil spring between said outwardly projecting member and the upper end of said sleeve member tending to maintain the sleeve projecting beyond the closed end of said tubular member, said sleeve being movable to uncover the apertures in said tubular member and means to limit the relative movement between the sleeve and tubular member.

10. A device of the class described comprising a tubular member having an aperture for connection at one end to a liquid supply and having the other end closed, a sleeve member slidably positioned over the apertured portion of said tubular member, said sleeve having a perforation which may register with the aperture within said tubular member and means tending to maintain said sleeve member in normal position so that the perforations therein do not register with the aperture in said tubular member whereby when pressure is applied to said sleeve to move the same the perforations therein will register with the aperture in said tubular member and the liquid may flow out of said apertures and when said pressure is released said sleeve is automatically returned to normal position.

11. A battery filler comprising a tubular member for connection at one end to a closed liquid supply, said member having the other end closed and having an aperture adjacent the closed end, a sleeve member slidably positioned over the apertured portion of said tubular member and having a supporting portion normally extending therebelow for resting on the plates of the battery, said filler when in operative position having the upper edge of said aperture a distance above the lower end of said filler substantially equal to the distance from the top of the plates to the desired liquid level whereby the level of the liquid will be gauged from the top of the plates.

WILLIAM C. DESMOND.